(12) United States Patent
Divakaran et al.

(10) Patent No.: US 9,916,520 B2
(45) Date of Patent: Mar. 13, 2018

(54) AUTOMATED FOOD RECOGNITION AND NUTRITIONAL ESTIMATION WITH A PERSONAL MOBILE ELECTRONIC DEVICE

(71) Applicant: SRI International, Menlo Park, CA (US)

(72) Inventors: Ajay Divakaran, Monmouth Junction, NJ (US); Weiyu Zhang, Philadelphia, PA (US); Qian Yu, Plainsboro, NJ (US); Harpreet S. Sawhney, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 295 days.

(21) Appl. No.: 14/567,107

(22) Filed: Dec. 11, 2014

(65) Prior Publication Data

US 2016/0063734 A1 Mar. 3, 2016

Related U.S. Application Data

(60) Provisional application No. 62/045,117, filed on Sep. 3, 2014.

(51) Int. Cl.
*G06K 9/00* (2006.01)
*G06T 7/00* (2017.01)
(Continued)

(52) U.S. Cl.
CPC .......... *G06K 9/6202* (2013.01); *G06K 9/4642* (2013.01); *G06K 9/4671* (2013.01);
(Continued)

(58) Field of Classification Search
None
See application file for complete search history.

(56) References Cited

U.S. PATENT DOCUMENTS

| 8,345,930 B2 | 1/2013 | Tamrakar et al. |
| 8,439,683 B2 | 5/2013 | Puri et al. |

(Continued)

OTHER PUBLICATIONS

Puri et al., "Recognition and Volume Estimation of Food Intake using a Mobile Device," IEEE Workshop on Applications of Computer Vision (WACV), Dec. 2009, 8 pages.

(Continued)

*Primary Examiner* — Matthew Bella
*Assistant Examiner* — Jose M Torres
(74) *Attorney, Agent, or Firm* — Moser Taboada

(57) ABSTRACT

A food recognition assistant system includes technologies to recognize foods and combinations of foods depicted in a digital picture of food. Some embodiments include technologies to estimate portion size and calories, and to estimate nutritional value of the foods. In some embodiments, data identifying recognized foods and related information are generated in an automated fashion without relying on human assistance to identify the foods. In some embodiments, the system includes technologies for achieving automatic food detection and recognition in a real-life setting with a cluttered background, without the images being taken in a controlled lab setting, and without requiring additional user input (such as user-defined bounding boxes). Some embodiments of the system include technologies for personalizing the food classification based on user-specific habits, location and/or other criteria.

20 Claims, 8 Drawing Sheets

(51) Int. Cl.
*G06K 9/62* (2006.01)
*G06K 9/46* (2006.01)

(52) U.S. Cl.
CPC ......... *G06K 9/6223* (2013.01); *G06K 9/6269* (2013.01); *G06T 2207/10024* (2013.01); *G06T 2207/30128* (2013.01)

(56) References Cited

U.S. PATENT DOCUMENTS

| | | | | |
|---|---|---|---|---|
| 9,349,297 | B1* | 5/2016 | Ortiz | H04N 7/18 |
| 9,424,495 | B1* | 8/2016 | Trevino | A61B 5/4866 |
| 2010/0111383 | A1* | 5/2010 | Boushey | G06K 9/00 382/128 |
| 2010/0332571 | A1* | 12/2010 | Healey | G06F 19/3475 707/759 |
| 2011/0243392 | A1* | 10/2011 | Miyahara | G06Q 30/02 382/110 |
| 2012/0135384 | A1* | 5/2012 | Nakao | A23L 33/30 434/127 |
| 2012/0170801 | A1* | 7/2012 | De Oliveira | G06K 9/6256 382/103 |
| 2012/0183932 | A1* | 7/2012 | Chang | G09B 5/125 434/127 |
| 2013/0027424 | A1* | 1/2013 | Mochizuki | G06F 19/3475 345/620 |
| 2013/0058566 | A1* | 3/2013 | Sato | G06K 9/4642 382/159 |
| 2013/0260345 | A1 | 10/2013 | Puri et al. | |
| 2016/0035248 | A1* | 2/2016 | Gibbs | G06T 7/0002 434/127 |

OTHER PUBLICATIONS

Shroff et al., "Wearable Context-Aware Food Recognition for Calorie Monitoring," 12th IEEE International Symposium on Wearable Computers, Sep. 2008.

Hou et al., "Saliency detection: A spectral residual approach," IEEE Conference on Computer Vision and Pattern Recognition, Jun. 2007, 8 pages.

Felzenszwalb et al, "Efficient graph-based image segmentation," International Journal of Computer Vision, vol. 59, No. 2, Sep. 2004, 26 pages.

* cited by examiner

AUTOMATED FOOD RECOGNITION AND NUTRITIONAL ESTIMATION WITH A PERSONAL MOBILE ELECTRONIC DEVICE

CROSS-REFERENCE TO RELATED APPLICATION

This application claims the benefit of and priority to U.S. Provisional Application Ser. No. 62/045,117, filed Sep. 3, 2014, which is incorporated herein by this reference in its entirety.

BACKGROUND

This disclosure relates to the technical field of computer vision. In computer vision, mathematical techniques are used to detect the presence of and recognize various items that are depicted in digital images. Localized portions of an image, on which specific types of computations are performed to produce visual features, may be used to analyze and classify objects depicted in the image. Low-level features, such as interest points and edges, edge distributions, color distributions, shapes and shape distributions, may be computed from portions of an image and used to detect items that are depicted in the image. Machine learning algorithms can be used for feature recognition.

BRIEF DESCRIPTION OF THE DRAWINGS

This disclosure is illustrated by way of example and not by way of limitation in the accompanying figures. The Figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
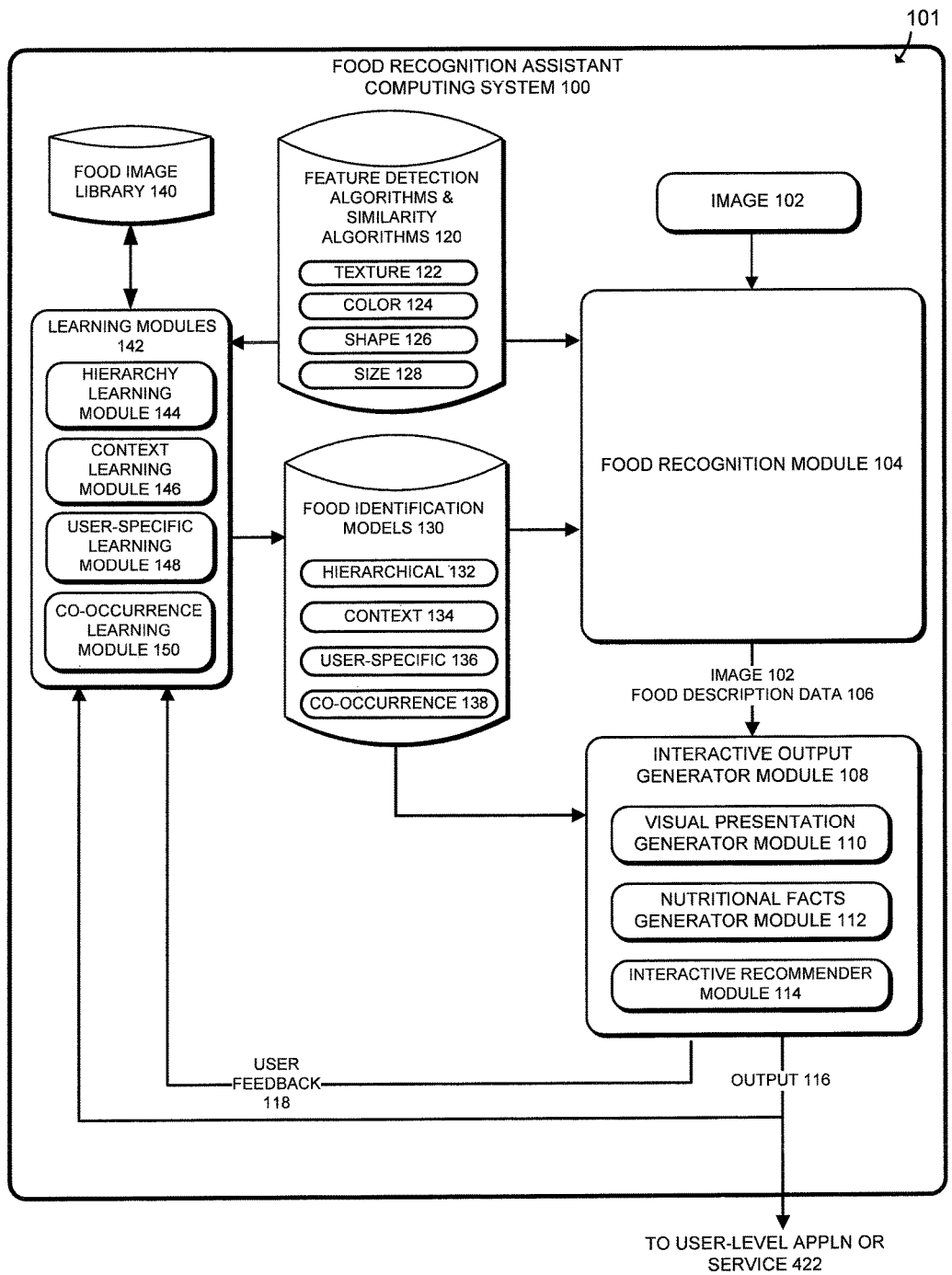
FIG. 1 is a simplified schematic diagram of an environment of at least one embodiment of a food recognition assistant computing system, including a food recognition module as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Automated food recognition without human assistance is a challenging computer vision problem, because of the large number of different foods that people consume, the wide variety of different ways that individual foods can be prepared, combined, and presented, and the importance of color and texture in accurately distinguishing one food from another. For example, it may be difficult for an automated food recognition system to distinguish mashed potatoes from a plate of pasta, or to distinguish a piece of bread from mashed potatoes located on the same plate. Moreover, even if the food recognition system accurately detects an individual item of food, like a potato, without help from a user, it is a further challenge for the system to accurately determine whether the item is being served by itself or as part of a more complex dish, such as a potato salad or a casserole, without user assistance.

Accurate identification of food being consumed is an important task to many people, including those that suffer from food-born allergies, those who participate in weight-loss programs, and those who just enjoy eating and trying new foods. Furthermore, tracking food intake is a major health concern yet is highly inconvenient since the state of the art requires laborious manual record-keeping. Many existing meal tracking services require selecting food items from hierarchical menus or using search queries, which is time consuming as it is often difficult to find the right food in the predefined lists. The tedium of the meal tracking process prevents many people from logging their food intake for extended periods of time.

Many people share pictures of food over the Internet through social media services like PINTEREST, INSTAGRAM, and FACEBOOK. However, a picture of a plate of food can be difficult to describe or "tag" accurately without any assistance from the person who took the picture. Technology for automatically and accurately identifying food depicted in a digital image, as disclosed herein, can aid people in a variety of ways, including the management of food allergies, weight loss programs, and merely helping people know what they are eating, if the food is unknown. Automated food recognition from an image as disclosed herein can enable the average consumer to monitor their health more effectively by simply using an image of food to measure intake, rather than painstakingly keeping a log of all foods eaten. Moreover, the food recognition technologies disclosed herein can be used in combination with other applications, such as applications that track physical activity.

Some embodiments of the present invention allows a user of a personal mobile electronic device to identify food and, optionally, determine associated nutritional content, simply by taking a picture of a plate of food. In one usage scenario, the user points a camera at the plate of food. In some embodiments, the camera may be configured to display a graphical indicator, such as a circle, on the viewing screen or viewfinder, in order to encourage the user to position the camera such that the majority of the foods are within the area suggested by the graphic. Such a graphical indicator is by no means required, however. Once the user captures the image of the food with the mobile camera, the disclosed automated computer vision-enabled food recognition process is initiated. Once the food recognition process is finished, the results are presented on the picture-taking device or another device equipped with a display screen. In some embodiments, the automated computer vision-enabled food recognition process disclosed herein generates bounding boxes around each algorithmically-identified food item, and the bounding boxes are displayed on the display screen of the picture-taking device or other display device. The automated computer vision-enabled food recognition process disclosed herein can also output the identification of each food item, the confidence scores associated with each food identification, and the nutritional content of the identified food, for display by the picture-taking device or other display device. In an illustrative embodiment, the above-described process currently takes in the range of about 4 seconds to complete, including any delay due to network transmissions. The time to complete may of course be affected by factors independent of the disclosed technologies, such as network availability, bandwidth, and processing power of the computing devices involved.

Referring now to FIG. 1, an embodiment of a food recognition assistant computing system 100 is shown in the context of an environment 101 that may be created during the operation of the system 100 (e.g., a physical and/or virtual execution or "runtime" environment). The illustrative food recognition assistant computing system 100 is embodied as a number of machine-readable components, such as instructions, modules, data structures and/or other components, which may be implemented as computer hardware, firmware, software, or a combination thereof. For ease of discussion, the food recognition assistant computing system 100 may be referred to herein as a "food recognition assistant," a "food recognition system," or by similar terminology.

The food recognition assistant computing system 100 executes one or more feature detection algorithms, including machine learning algorithms, semantic reasoning techniques, similarity algorithms, and/or other technologies to, among other things, in an automated fashion detect, recognize and describe one or more food items that are depicted in a digital image 102. As described in more detail below, the illustrative computing system 100 can, among other things, help users quickly and easily identify the presence of a particular food or combination of foods in the image 102. The computing system 100 can also estimate a portion size of each identified food, and present nutritional information that relates to identified foods and their estimated portion sizes. The computing system 100 can, alternatively or in addition, generate natural language descriptions of food items detected in the image 102 (and/or natural language descriptions of combinations of identified food items). Such descriptions can be used for, among other things, automatically updating a user's food log, or to tag the image to facilitate searching, retrieval, or for establishing links between the image 102 and other electronic content.

The illustrative food recognition assistant computing system 100 includes a food recognition module 104, an interactive output generator module 108, a number of learning modules 142, a number of feature detection algorithms and a number of similarity algorithms illustratively stored in one or more data stores (collectively shown as algorithms 120, for simplicity of illustration), a number of food identification models 130, and a food image library 140. As described below with reference to FIG. 4, portions of the food recognition assistant computing system 100 may be embodied as a "front end" application that resides on a personal mobile electronic device, while other portions of the system 100 (e.g., "back end" processing routines) reside on one or more server computers. Alternatively, all of the components of the computing system 100 may be embodied on a single computing device, such as a smart phone, tablet computer, or wearable computing device, in other implementations.

In operation, the food recognition module 104 applies one or more feature detection algorithms and similarity algorithms 120 to the image input 102, using one or more food identification models 130, and generates food description data 106 based on the output of the algorithms 120 and the application of the food identification models 130. The illustrative food recognition module 104 executes different feature detection algorithms 120 on the image 102. Some examples of feature detection algorithms that may be used by the food recognition module 104 include a histogram of oriented gradients (HoG), an edge orientation histogram, a scale-invariant feature transform descriptor (SIFT), and a shape context technique.

The feature detection algorithms 120 are used to identify features (e.g., pixel-based or region-based low-level features) and characteristics of the image 102 that can be used to identify a food depicted in the image 102. As described in more detail below, the detected features are used to identify one or more salient regions of the image, encode the image with low-level and/or natural-language descriptors, and compare similarities between different salient regions of the image. The low level feature detectors include, for example, texture 122, color 124, shape 126, and size 128 detectors. The illustrative food recognition module 104 utilizes a combination of descriptors developed as a result of application of, e.g., at least two of the texture 122, color 124, shape 126, and size 128 detectors. As an example, a pizza slice often exhibits a clear wedge shape, regardless of the toppings on the pizza. However, other foods do not exhibit clear shapes and other information is needed to distinguish them. For instance, salads and rice are amorphous in shape, and their general shape is not distinctive enough to accurately identify the food from the image (e.g., without any other input).

One or more of the feature detection algorithms 120 (e.g., color detection algorithms 124) can detect color, but color can vary between images given the wide range of imaging devices that are capturing images of food. For example, white-balance settings, environment lighting, and other internal image-sensor settings and variations can cause the color of the image to be distorted. As described in more detail below, the food recognition module 104 is designed to be robust enough to account for these differences.

Figure 6A:
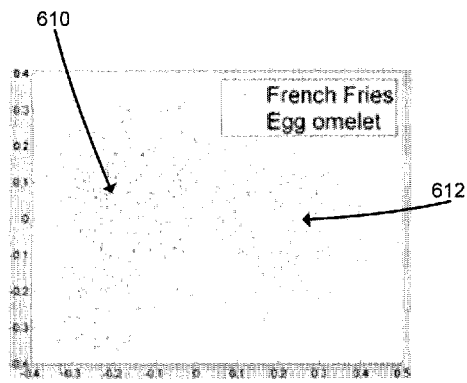
FIGS. 6A-6D are illustrative plots showing results of the automated food recognition techniques disclosed herein.
Figure 6B:
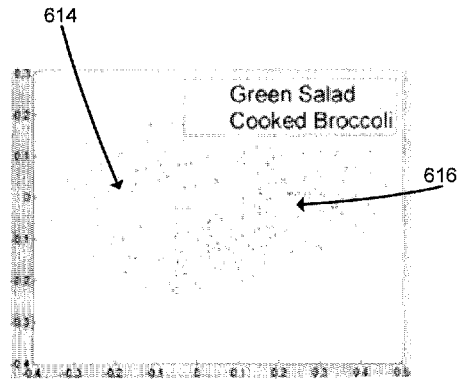

The feature detection algorithms 120 can detect texture using one or more texture detection algorithms 122 (e.g., gradient-based algorithms). For example, a HoG feature can be extracted on the gradient of the grey scale of the image 102, so that it encodes the texture information of the image. Two food items with confusingly similar colors, for example, French fries and egg omelets, can be discriminated based on different textures captured by the HoG feature. FIGS. 6A and 6B are illustrative plots showing results of the application of a dense HoG algorithm to distinguish, in FIG. 6A, French fries from an egg omelet, and in FIG. 6B, a green salad from cooked broccoli. In the plots 6A and 6B, each dot represents the detection of one labelled food instance. In FIG. 6A, area 610 represents an area of an image in which a concentration of French fries was detected while area 612 represents an area of the same image in which a concentration of egg omelet was detected by the HoG algorithm. In FIG. 6B, area 614 represents an area of an image in which a concentration of green salad was detected while area 616 represents another area of the same image in which a concentration of cooked broccoli was detected by the HoG algorithm.

The illustrative food recognition module 104 utilizes a dense HoG descriptor as follows. Variations on the described approach, and/or other approaches, are also possible, of course. The illustrative HoG descriptors are densely extracted on a regular grid at steps of, e.g., eight pixels. The illustrative HoG features are computed, resulting in an e.g., 31-dimension, descriptor for each node of the grid. Then, the e.g., 2×2, neighboring HoG descriptors are stacked together to form a descriptor with, e.g., 124 dimensions. The stacked descriptors spatially overlap. The e.g., 2×2, neighbor stacking results in higher feature dimensionality, which provides better descriptive power.

The illustrative food recognition module 104 also or alternatively utilizes dense SIFT descriptors to analyze texture as follows. Variations on the described approach, and/or other approaches, are also possible, of course. The illustrative SIFT descriptors are densely extracted using a flat rather than a Gaussian window on a regular grid at steps of, e.g., 5 pixels. The e.g., three, descriptors are stacked together for each hue-saturation-value (HSV) color channel. The illustrative SIFT feature is computed at multiple different scales of resolution (e.g., using two different scales).

Figure 6C:
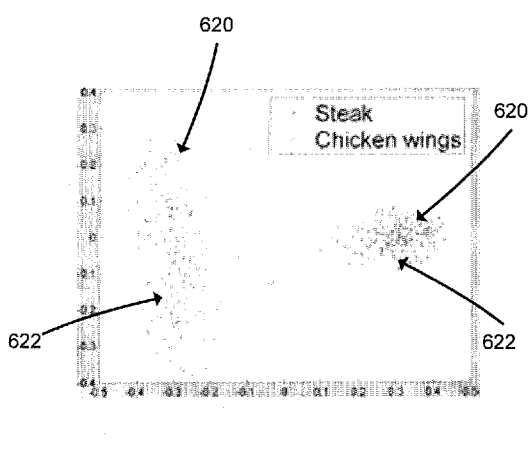
Figure 6D:
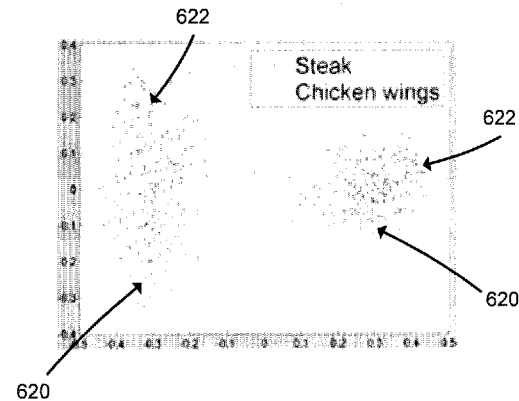

The SIFT feature captures similar information as the HoG feature. However, the SIFT feature has different discrimination power at different scales. For example, a cluster of food can be better discriminated at a smaller scale than at a larger scale. As shown in FIGS. 6C and 6D, steak and chicken wings are both clustered into two clusters. One cluster is discriminated better at a smaller scale (FIG. 6C, e.g., 16×16 resolution) and the other cluster is better discriminated at a larger scale (FIG. 6D, e.g., 32×32 resolution). In FIGS. 6C and 6D, areas 620 represent areas of an image in which chicken wings were detected at one scale, while areas 622 represent areas of the same image in which steak was detected, at a different scale. Consequently, the illustrative food recognition module 104 applies a combination of the feature detection algorithms 120 to detect features at multiple different scales, and the detection results for the multiple scales can be fused together to improve the identification of the food in the image 102.

The food recognition module 104 outputs food description data 106. The food description data 106 semantically describes one or more foods depicted in the image 102, as determined by the food recognition module 104. In the illustrative embodiments, the food description 106 is generated algorithmically by the computing system 100 analyzing the image input 102. The illustrative food description data 106 generated by the food recognition module 104 at least names the food present in the image 102, such as "lasagna," "taco," or "hamburger." The food description data 106 can also include an annotated version of the image 102 with the algorithmically identified regions marked with identifying information. The food description data 106 may be embodied as, for example, a natural language word or phrase that is encoded in a tag or label, which the computing system 100 associates with the image 102. Alternatively, or in addition, the food description data 106 may be embodied as structured data, e.g., a data type or data structure including semantics.

To generate the food description 106, the illustrative food recognition module 104 accesses one or more feature detection algorithms 120 and one or more food identification models 130. The food identification models 130 are embodied as software, firmware, hardware, or a combination thereof. The food identification models 130 are developed or "trained" by correlating a suitably large sample of user-generated images of food with known foods, where the sample of user-generated images is stored in a food image library 140. In some embodiments, an input image 102 (e.g., a pictures of a plate of food taken by a mobile device user) is algorithmically compared to the library 140 of pre-determined food images until matching content is found. In the illustrative embodiment, the food identification models 130 correlate semantic descriptions of the food with known descriptions of food, in order to identify the food in the image 102. The semantic descriptions of features that are maintained by the food identification models 130 may be embodied as natural language descriptions and/or structured data. As described in more detail below, the food description data 106 can be determined using semantic reasoning. To establish "relationships" and "associations" as described herein, the computing system 100 may utilize, for example, a knowledge representation language or ontology.

The food identification models 130 include a hierarchical model 132, a context model 134, a user-specific model 136, and a co-occurrence model 138. However, other food identification models 130 are also included in this disclosure. As will be described in more detail below, the specific food identification models identified use different methods to help the food recognition module 104 to accurately identify food present in the image 102. The hierarchical model 132 uses the generated semantic descriptions of the image to navigate a food ontology to identify a food present in the image 102. The context model 134 collects context data regarding the taking of the image, such as location, date and time, and compares the contextual information regarding the context of the image taking to a database of known foods associated with the context information. For example, if the location of the image 102 is known and compared to a geographic map, and it is determined that the image was taken in a food dispensary located on the geographic map at the same location at which the image was taken, e.g., a restaurant, grocery store, or other place that dispenses food, then the food recognition module 104 can compare the image 102, or a semantic description of the image, to a known menu of the corresponding food dispensary. The user-specific model 136 compares the food image, or the semantic descriptions of food, to previously collected and stored information about foods that have been consumed by the user. Thus, if the user commonly eats steak for breakfast, the user-specific model and the context model 134 may help the food recognition module 104 quickly identify a food on the user's breakfast plate as steak (as opposed to, for example, a sausage patty). The co-occurrence model 138 relies on common relationships between foods to identify other foods that are likely to be present in the image. For example, if the food recognition module 104 identifies one of the foods present in an image as fried eggs, using the co-occurrence model 138, the food recognition module 104 can then compare the other foods present in the image 102 to foods that are commonly associated with or paired with fried eggs, such as toast or bacon. In this way, the co-occurrence model 138 can help the food recognition module 104 quickly identify meals that have combinations of foods that are frequently consumed together, such as hamburger and French fries or cake and ice cream.

In some embodiments, the food identification models 130 are designed to work together to identify the food present in the image in the most efficient manner. For example, the context model 134 and the user-specific model 136 can work together to identify the food present in an image. If the context model 134 detects that the user snaps an image of food in the morning, the context model 134 can cooperate with the user-specific model 136 to determine what foods the user commonly eats for breakfast, and compare the image content to those foods first.

Once the computing system 100 has identified the food present in the image 102 and outputted the food description data 106, an interactive output generator module 108 of the computing system 100 can do a number of different things with the food description information. The interactive output generator module 108 and its submodules, a visual presentation generator module 110, a nutritional facts generator module 112, and an interactive recommender module 114, are each embodied as software, firmware, hardware, or a combination thereof.

Figure 5A:
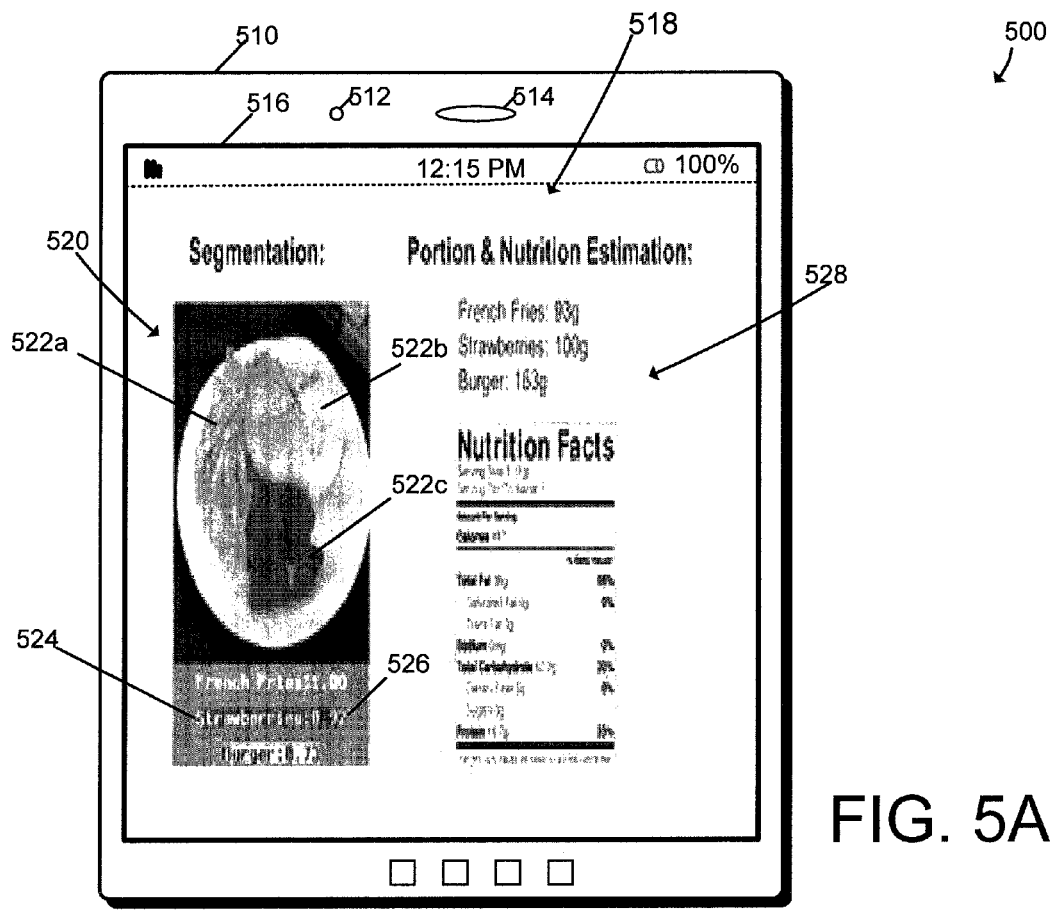
FIGS. 5A and 5B are simplified schematic illustrations of exemplary display screens of a personal mobile electronic device, with each figure showing at least one embodiment of output of the system of FIG. 1, as disclosed herein.
Figure 5B:
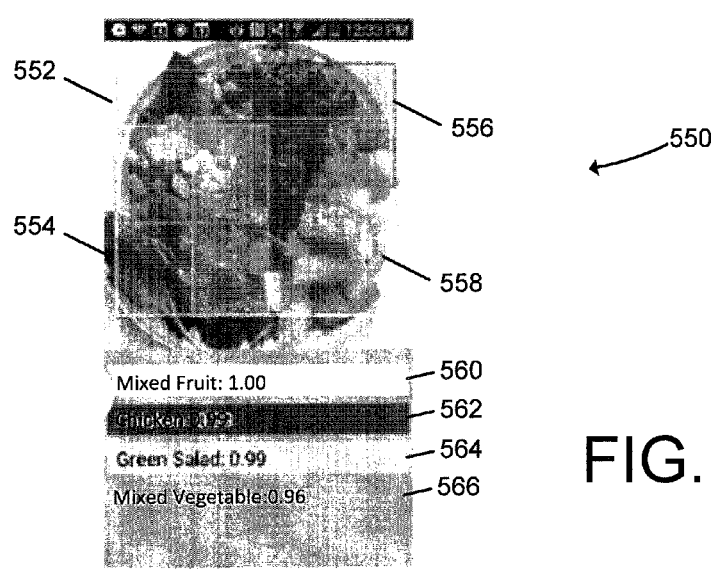

In the illustrative embodiment, the visual presentation generator module 110 of the interactive output generator module 108 generates one or more outputs 116 that identify the foods detected in the image 102, and displays the image 102 at a display device of the computing system 100. In some embodiments, the visual presentation generator module 110 demarcates the different portions of the image 102 that have been identified as different foods. For example, if an image of food contains the foods of chicken, rice, and green beans, then the visual presentation generator module 110 correspondingly marks the portions of the image 102 that the food recognition module 104 has identified as chicken, rice, and green beans (e.g., by color coded shading, as shown in the example of FIG. 5A, or bounding boxes, as shown in the example of FIG. 5B).

The nutritional facts generator module 112 of the interactive output generator module 108 can be used to automatically generate nutritional facts associated with each identified food for inclusion in the output 116. The nutritional facts generated by the nutritional facts generator module 112 can be a reproduction of the FDA Nutrition Facts Label attached to packaging of the identified food, or the nutritional facts generated can be a more customized set of nutritional facts. For example, if a person is a on a particular diet that minimizes certain types of food intake, such as protein, the nutritional facts generated can be customized by a user to highlight protein content.

The illustrative food recognition module 104 can estimate food volume, or portion size, of each food identified in the image 102. In some embodiments, the computing system 100 includes a camera with three-dimensional (3D) image capture capabilities, which can be used to estimate food volume or portion size to more accurately estimate the calories and nutritional elements consumed. Alternatively, the food recognition module 104 estimates food volume or portion size by counting the pixels in the region of the image in which the identified food is detected (e.g., a salient region 232 or salient region grouping 234, described below). Once the food recognition module 104 determines the food volume/portion size of an identified food, the calories and/or other nutritional information about the food in the image 102 can be estimated by accessing e.g., external databases that store nutritional information. To do this, the food recognition module 104 or the nutritional facts generator module 112 may access a mapping table or knowledge base that maps detected portion sizes to corresponding nutritional information for various foods.

The nutritional facts generated by the nutritional facts module 112 can be automatically incorporated into a health monitoring service for effectively tracking the food intake of a user (e.g., by interfacing with the health monitoring service over a network). In some embodiments, the computing system 100 tracks food consumed by a user over time and updates the user-specific model 136 with the user's personal food consumption data. In some embodiments, the computing system 100 builds a model of a user's typical food preferences and choices, and the interactive recommender module 114 can then interactively recommend content to the user, such as recipes, coupons, promotions, advertisements, reviews, news articles, and dietary/health advice. This type of aggregated data can be especially useful to a user because it relates fully to the overall eating patterns and choices of the user. Similarly, the interactive recommender module 114 can leverage the aggregated knowledge about the user's food consumption history to engage in a spoken natural language dialog with the user to answer user questions, such as a grocery shopper asking "what should I make for dinner tonight?" or "show me some recipes for eggplant that I would like." Using the more advanced mobile image sensing devices, the computing system 100 can recognize food, estimate the calorie and nutritious of foods automatically without any user intervention.

The interactive output generator module 108 also outputs information to one or more of the learning modules 142, or to one or more user-level applications or services 422 (e.g., a meal tracking application, food journal, or health monitoring service) through the output 116 and/or the user feedback 118. As noted above, some embodiments of the food recognition computing system 100 do not require any user inputs (other than the taking of a picture) in order to operate. The output 116 can include automatically sending the results of the food recognition system 100 to one or more of the learning modules 142 or to an application or service 422. Other embodiments of the food recognition computing system 100 include collecting user feedback 118 concerning the results of the algorithmic identification of foods in the image 102. The user feedback 118 includes sending the user-created information to the learning modules 142 from time to time to further update and refine the food identification models 130.

The illustrative learning modules 142 include a hierarchy learning module 144, a context learning module 146, a user-specific learning module 148, and a co-occurrence learning module 150. The learning modules 142 execute machine learning algorithms on samples of food images and create and/or update the food identification models 130 and the food image library 140. For example, the learning modules 142 may be used to initially populate and/or periodically update portions of the food identification models 130, such as the food ontology that can be part of the hierarchy model 132, or the user-specific model 136.

The hierarchy learning module 144 analyzes sample images from the food image library 140 or images and food identifications from the output 114 or user feedback 118, in order to populate or update the hierarchical model 132. When using images from the food image library 140, appropriate types of images are preferably selected. There are abundant food images available in popular image databases like IMAGENET, FLICKR or GOOGLE IMAGES. One option for populating the hierarchy model 132 is to come up a list of pre-defined foods, search for an image of the food, clean the labels from the image, and populate the food image library 140 with the images. However, the images available in many popular web-based image databases are often from advertisements and they bear little resemblance to the pictures taken by the user. These ad images are often posed for aesthetic purposes, with controlled lighting, non-realistic views (e.g. burger are often shot from side view with all layers exposed), or even depict artificially optimized foods. Thus, a food classifier developed from these web images operates poorly when used on images taken "in the wild" e.g., on a mobile camera. The training set of food images preferably should emphasize, or at least include, realistic consumer-generated photos, versus purely restaurant-style or otherwise professionally-generated photographs. Thus, for training generic, non-user-specific models, searching for relevant images on user-oriented services such as INSTAGRAM and TWITTER may yield more suitable images than photo databases like GOOGLE IMAGES or FLICKR.

In some embodiments of the computing system 100, the food image library 140 is developed by training a supervised learning model such as a multiple class support vector machine (SVM) for each category of food. For example, a stochastic gradient may be used to train the classifier. The classifier training is done through an iterative process of algorithmically analyzing known food images, comparing the results of the algorithm to the known foods, and updating the model so that the learned classifier is more discriminative. To pick the set of food items represented in the model is a non-trivial task. To initialize the model, certain hierarchical relationships between food items are assumed (e.g., a form of coarse-to-find hierarchical relationship). If the semantic granularity is too coarse the appearance variance may be too large, such that the learnt classifier may not generalize well. For example, with coarse semantic granularity, four very visually different food items may all be classified as "sandwiches." Conversely, if the semantic granularity is too fine, then the number of classes could increase exponentially and affect system performance. For example, four very visually similar food items may be classified using four different labels, e.g., beef, beef brisket, beef stew, and steak.

The illustrative hierarchical model 132 uses a food ontology to organize food into food categories. An example of a suitable ontology is a Directed Acyclic Graph (DAG), in which one node represents one food category. The root node of this food ontology is simply food, and a single directed edge connects one parent node to one child node. The edge represents the IS-A ("is a") relationship. A node closer to the leaf is a more concrete food category while a node closer to the root is a more general one. The DAG food ontology helps to organize the large amount of food categories and control the mapping from semantic food descriptions to classifiers. For example, a node corresponds to one classifier. It may contain a single concrete food category, such as beef brisket, or a more general food category, such as red meat.

During the establishing of semantic labels, the hierarchical model 132 labels each example image by specifying the path from the root node to the leaf node in the food ontology. At each level the model 132 asks a multiple-choice question to specify which children nodes it belongs to. The number of questions depends on the depth of the DAG. A typical depth of a DAG is seven. As there may be hundreds of different food categories, choosing the exact label by scrolling down a long list can be hard and extremely time consuming. Instead, a few simple questions can be asked to reduce the labelling time drastically. During the training, the food ontology renders an automatic split of the positive/negative training data. To train a classifier corresponding to one node, all the images corresponding to the node and its children are combined as positive and all the images corresponding to the rest nodes (including non-food) are used as negative.

Customized food databases can improve the recognition accuracy of foods in images. The results of analysis based on customized databases can be blended or fused with results based on a (larger) generic database. Except for the initial common foods, there are many highly customized foods that are specific to the user (e.g., homemade food) or foods that are specific to particular geographic locations (e.g., food served by a particular ethnic restaurant). When images of food are taken on mobile devices, such as smartphones, the user and location information are easily available due to the capabilities of the mobile device. It may be challenging to collect enough food pictures to recognize a variety of very customized foods. Thus, the food identification models 130 used by the food recognition computing system 100 can evolve and improve over time, generally through machine learning. Also, due to the many different variations of food around the world, further food identification accuracy gains can be realized by organizing customized food databases locally rather than globally. Moreover, the user-specific model 136 and the context model 134 can provide useful information to improve the food classification accuracy. For example, a user's dietary history, user dietary preferences, preferred restaurant style, etc., can be used to further "personalize" the food classification. The disclosed customized food database approach improves the food recognition system 100's ability to handle the classification of "in the wild" images without user assistance.

A context model 134 and a user-specific model 136 can also be used to improve the accuracy of the identification of food by the food recognition module 104. The context learning module 146 and the user-specific learning module 148 populate the corresponding food identification models 134, 136 with context and user-specific information, respectively. Personalized user databases and context-specific models/databases may be created to augment an existing generalized food database, in order to improve recognition accuracy.

The context model 134 is developed by collecting information about the surrounding situation in which the image was taken. This information can be collected by looking at meta data associated with the image by the camera application (e.g., date, time, location). The information that the context model 134 gathers includes geographic location at which the image 102 was taken, time the image 102 was taken, the date the image 102 was taken, and/or other information. The location data collected by the context learning model 146 can help the food identification models 130 better identify food, by narrowing the list of potential foods that can logically be present in the image 102. For example, if the geographic location that the image was taken is cross-referenced with a geographic map of the area, food recognition module can determine or infer that the image 102 was taken at a particular restaurant. The context model 134 can then search for a known menu of that restaurant and compare the image 102 to known food items served at the identified restaurant based on the menu. Other examples include using the time the image 102 was taken to narrow the set of candidate foods. For instance, if the image 102 were taken in the morning (determined based on the time stamp associated with the image 102), the context model 134 may first compare the image to likely breakfast foods. Also, date can be an important piece of context data to help accurately identify a food in an image. For example, if the image 102 was taken during a particular holiday season, then the context model 134 can compare the image 102 to foods that are commonly consumed during that holiday. The context learning module 146 collects the information that connects particular foods to a particular context and populates the context food identification model 134. The context learning module 146 may, over time, or as a result of analyzing portions of the food image library 140 and results generated by the food recognition module 104, algorithmically learn combinations of low level features that evidence particular relationships between food consumption and certain contextual cues, and update the context model 134 accordingly.

The user-specific learning module 148 gathers information specific to a particular user and populates the user-specific model 136 that compares an image to foods that have been historically or recently consumed by the user. User-specific models may include a collection of foods commonly eaten by the user, as determined by the user's past consumption history. These commonly eaten foods can be indexed by location, time-of-day, user identifier, or other criteria, to populate both the context model 134 and the user-specific model 136. Data indicative of various geographic locations can be stored in the user-specific model 136. In particular, locations in which food is repeatedly consumed by the user and/or other people, such as home, work, car, or restaurant, can be indexed. Culinary preferences of the user also can be indexed to narrow the search for the identification of new foods. User-specific preferences, like an affinity for particular foods (e.g., Italian food), or particular dietary restrictions (e.g., kosher or vegetarian), can be tracked. Also indexed are foods that are actually consumed by the user. Often times the best source for identifying the food in an image is a database of foods previously eaten by the user. Also, eating histories at particular locations can be indexed into the user-specific model 136 by the user-specific learning module 148.

The context model 134 and the user-specific model 136 can be used to narrow the set of foods that need to be searched, rather than simply using a generic food database for automatic food recognition. To accomplish this data leveraging, users are characterized by their identifiers, distributions of eating locations they frequent, and distributions of foods they eat. When a user is new to the system, the "generic" hierarchical database of trained foods found in the hierarchical model 132 is used to recognize the user's food items. When the user has used the system for an amount of time, e.g., beyond a certain number of days/times, the system 100 creates a personalized recognition database based on the user-specific model. When a frequent user uses the system, the backend recognition processes of the system 100 fuse decisions from the user's personalized database and the generic database to create an optimal decision. Geographic locations may be characterized into home, office, restaurants, and other such categories. The system 100 may create trained food databases for specific locations or sets of locations. When a given location or location set has a "critical mass" of food types, automated food recognition algorithmically fuses the context model 134, the user-profile model 136, and the more generic hierarchical model 132 into a single food identification model.

The co-occurrence learning module 150 gathers data from food recognition operations performed over time and populates the co-occurrence food identification model 138. The co-occurrence model 138 develop and maintains stronger logical relationships between food items that tend to co-occur commonly on a food plate, e.g., hamburger and fries, and weaker logical relationships between other combinations that are extremely rare. For a generic model, online recipes, menus, etc. can be mined by the co-occurrence learning module 150 to create a database of foods that are commonly presented together. Information from the context learning model 146 and the user-specific learning module 148 can be used to determine or generate co-occurrence data. Co-occurrence data can thus be used probabilistically to improve recognition of a particular item on the plate, given recognition results for one or more other items on the same plate. Time of day, and even time of year (occasion), can also be reflected in the co-occurrence data. Similar to the context learning module 146, the co-occurrence learning module 150 may, over time or as a result of analyzing portions of the food image library 140, and analyzing results generated from use of the food recognition module 104, algorithmically learn combinations of low level features that evidence particular co-occurrences of food, and update the co-occurrence model 138 accordingly.

Figure 2:
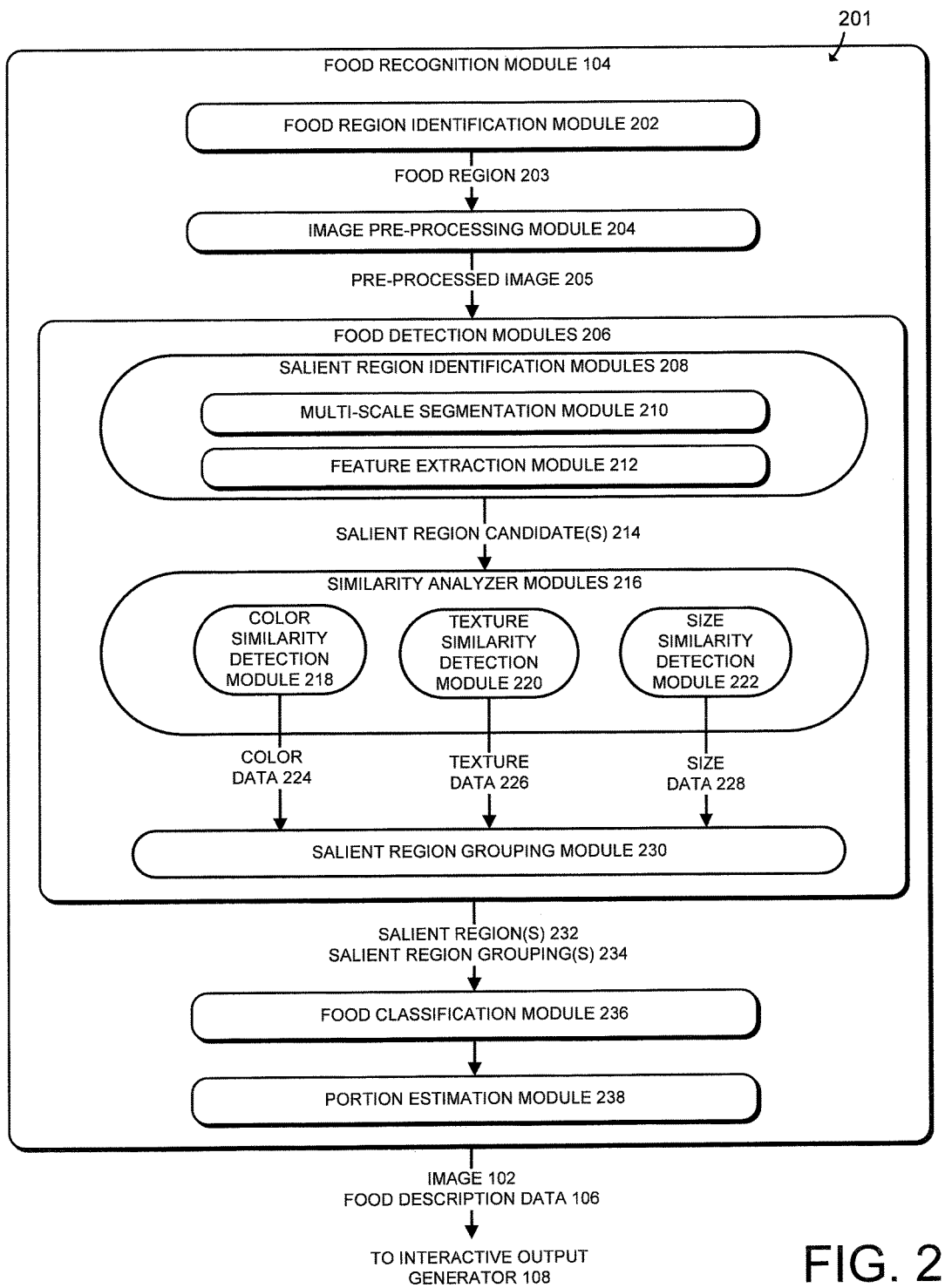
FIG. 2 is a simplified schematic diagram of an environment of at least one embodiment of the food recognition module of FIG. 1.

Referring now to FIG. 2, an embodiment of the food recognition module 104 is shown in greater detail, in the context of an environment 201 that may be created during the operation of the computing system 100 (e.g., a physical and/or virtual execution or "runtime" environment). The food recognition module 104 and each of the components in FIG. 2 are embodied as machine-readable instructions, modules, data structures and/or other components, in software, firmware, hardware, or a combination thereof.

Figure 7A:
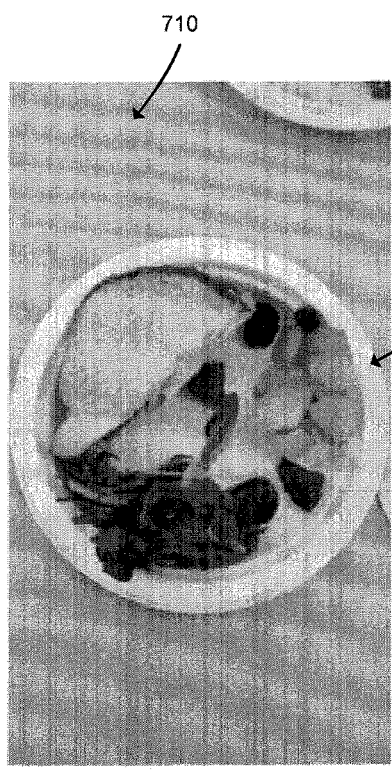
FIG. 7A is an illustrative digital image of a plate of food.
Figure 7B:
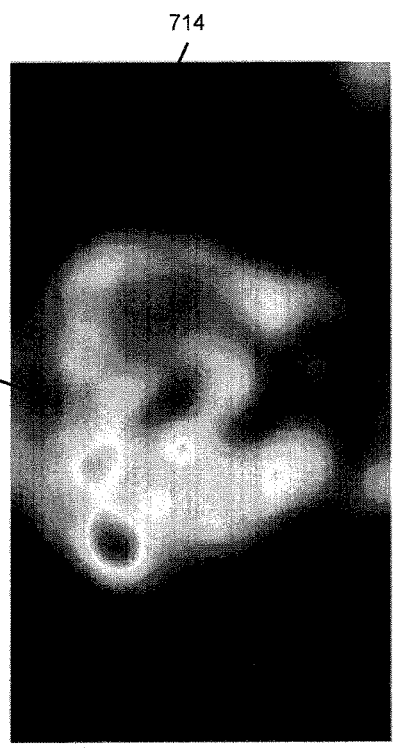
FIG. 7B is an illustrative saliency map of the image of FIG. 7A, produced using the automated food recognition techniques disclosed herein.

The illustrative food recognition module 104 includes a food region identification module 202, an image pre-processing module 204, a number of food detection modules 206, a food classification module 236, and a portion estimation module 238. The illustrative food region identification module 202 algorithmically locates one or more regions 203 of the image 102 that appear to be visually salient in comparison to other regions of the image 102. For example, the food region identification module 202 identifies the area of the image that depicts items in the foreground as opposed to the background. In other words, the food region identification module 202 guides the food recognition module 104 in determining where in the image 102 to look for food. This allows the system 100 to locate food in the image 102 without any human assistance. For instance, the system 100 can locate food regions without a human user circling, tapping on, or otherwise indicating where the food is in the image 102 on the camera display screen. In some embodiments, the food region identification module 202 utilizes a spectral residual approach to detect the food region 203. In some embodiments, the image 102 may be resized (e.g., so that the short dimension is a pre-determined number of pixels, such as 100 pixels), and then a food region saliency value is computed and combined with a threshold value to compute a binary saliency value. An example of algorithmic food region identification is shown in FIGS. 7A and 7B. FIG. 7A depicts a digital image of a plate of food. FIG. 7B is an illustrative saliency map of the image of FIG. 7A. The image of FIG. 7A can be divided into foreground 712 and background 710 regions. The resulting saliency map identifies area 716 as corresponding to the foreground 712 and area 714 as corresponding to the background 710. The food region and/or non-food region location information is utilized by the image pre-processing module 204 as described below.

When an image 102 is taken on a personal mobile electronic device, such as mobile camera, smartphone, or wearable device, the resolution of the image 102 can vary according to the sensor resolution, sensor orientation (portrait or landscape), and other settings of the camera taking the image. To ensure the result is invariant to these and/or other image-sensor specific factors, the image pre-processing module 204 down-samples and crops the image into a pre-processed image 205. In the illustrative embodiment the image 102 is down-sampled and cropped to a resolution in the range of about 400×400 pixels. The aspect ratio is fixed at, e.g., 1:1, since most food plates have that aspect ratio. As a result of the processing performed by the image pre-processing module 204, the food detection modules 206 can operate on a pre-processed version 205 of the image 102, which omits extraneous or irrelevant portions of the image (e.g., portions of the image that do not depict food or are very unlikely to be depicting food of significant interest).

The illustrative food recognition module 104 includes a number of food detection modules 206, including salient region identification modules 208 (which include a multi-scale segmentation module 210 and a features extraction module 212), similarity analyzer modules 216 (which include a color similarity detection module 218, a texture similarity detection module 220, and a size similarity detection module 222), and a salient region grouping module 230. The food detection modules 206, including the modules 208, 210, 212, 216, 218, 220, 222, and 230, are embodied as software, firmware, hardware, or a combination thereof. The various salient region identification modules 208, 210, 212, 216, 218, 220, 222, and 230 analyze different aspects of the pre-processed image 205 using one or more of the feature detection algorithms and similarity algorithms 120 in combination with one or more of the food identification models 130.

The salient region identification modules 208 identify one or more salient regions 232 or salient region candidates 214 of the pre-processed image 205 that correspond to food. The salient regions 232 or salient region candidates 214 of the image 205 are detected as a result of multi-scale segmentation performed by the multi-scale segmentation module 210 and low level feature extraction performed by the feature extraction module 212 using one or more features detection algorithms 120. The feature detection algorithms 120 can include, e.g., a histogram of oriented gradients (HoG), an edge orientation histogram, a scale-invariant feature transform descriptors (SIFT), a shape context technique, and/or a spectral residual approach, as described above.

In some embodiments, the features extraction module 212 encodes the pre-processed image 205 with a variety of low-level feature descriptors (e.g., feature vectors). The algorithms used to detect the salient regions of the image 205 can also define various characteristics of the image 205. For example, the HoG algorithm can detect texture information in the image 205 and the SIFT algorithm can detect color information. Since no two images have identical lighting and other settings, and since no food looks exactly similar, these low-level descriptors encoded into the image can be important to accurately identify the food. In some embodiments, the low level feature descriptors may be supplemented or replaced by natural language descriptors, e.g., by the food classification module 236 described below. The natural-language low-level descriptors can provide a level of abstraction to the features of the food that greatly aid in accurately identifying the food. For example, after detecting color, texture, and size data, the salient region identification modules 208 can then assign low-level descriptor words like "green," "smooth," or "chunky" to the image 205, or to a portion of the image 205. These descriptors can then be searched and compared to low-level features of other known foods. Sometimes, the specificity of measurements performed by a computer can confound the food identification process. For example, while all green beans look similar, not all green beans share the exact same shade of green, and describing a food using a combination of different low-level descriptors helps to accurately identify foods present in an image.

In some embodiments, the low-level features are represented as Bag of Visual Word (BoVW). Using BoVW, a codebook of K centroids (visual words) is obtained by k-means clustering, and each local descriptor is assigned to the closest centroid. The BoVW representation includes the histogram of counts of each image descriptor. In some embodiments, the Fisher vector is used, alternatively or in addition to the BoVW by encoding high-order statistics (e.g., first order and, optionally, second order). The Fisher vector describes how the set of descriptors deviates from an average distribution of descriptors, modeled by a parametric generative model. Similar to BoVW, the Fisher vector can capture the information conveyed by a set of descriptors into a fixed-length signature. Either K-means clustering or the Gaussian Mixture Model (GMM) can be used to learn the codebook. In the GMM, each descriptor x is represented as: $u_\gamma(x)=\Sigma_1^K w_i u_i(x)$. The parameters represent the mixture weight, mean vector and variance matrix (assumed diagonal) of each Gaussian mixture. The final Fisher vector is the concatenation of each component. If there are K mixtures, and the original feature has d dimension, then the Fisher vector would have 2Kd dimension. As an example, suppose K=256, and feature dimension is reduced to 64 using principal component analysis. A spatial pyramid is used to reduce the dimension of the descriptor.

The multi-scale segmentation module 210 segments the image 205 into a number of salient regions using multiple scales. Particularly when there are multiple foods on the plate, the foods have to be delineated before the individual foods can be identified. Also, many foods are composed of different ingredients that can be seen on the plate. For example, salad is composed of lettuce, tomatoes, cucumbers, and other vegetables, all of which are individually identifiable in the image 205. The multi-scale segmentation module 210 uses a multi-scale segmentation technique to identify the salad, because a single scale segmentation would not be as helpful in identifying a complex food like salad. One single strategy may not exist for multiple segmentations. There are many reasons why salient regions should be grouped together, and not all of the reasons for grouping are consistent with each other. For example, texture data might warrant particular segmentation, but color data might warrant a different segmentation. Hence the multi-scale segmentation module 210 performs segmentation with multiple cues and on multiple scales and outputs multi-scale one or more salient region candidates 214. To identify only a single food in an image, or if the image only depicts a single food, multi-scale segmentation and feature extraction may still be used to provide more accurate food identification. Alternatively, for some foods, feature detection and extraction may be sufficient, without the multi-scale segmentation.

In some embodiments, the multi-scale segmentation module 210 performs a hierarchical segmentation, determines the salient regions that are candidates for food identification and segments the image 205 into these salient region candidates. Then the low-level features encoded at different locations and scales are extracted and analyzed by the similarity analyzer modules 216, grouped by the salient region grouping module 230, and the resulting salient regions 232 and/or salient region groupings 234 are classified into different kinds of foods using, e.g., a linear SVM classifier. In some embodiments, the portion estimation module 238 estimates the volume of the identified food by counting the pixels in the corresponding food segment. Once the food volume is determined, the system 100 can estimate the calories and the nutritional value of the foods.

The similarity analyzer modules 216 analyze the multi-scale salient region candidates 214 for similarities between salient region candidates 214, to identify the foods present in the image 205 and to localize the identified foods in the image. The similarity analyzer modules 216 use both the detected features and the low-level feature descriptors that have been encoded in the image 205 by the feature extraction module 212, to detect similarities between different areas of the image. The color similarity detection module 218 computes the similarities in color between discrete instances of salient region candidates 214 and produces color data 224. In the illustrative embodiment, to obtain the color data 224 the color similarity detection module 218 obtains a one-dimensional color histogram for each color channel, and computes similarity using a min-intersection kernel. The texture similarity detection module 220 computes similarities in texture between discrete salient region candidates 214 and computes texture data 226. In the illustrative embodiment, the texture similarity detection module 220 obtains the texture data 226 by using fast SIFT-like measurements. The illustrative texture similarity detection module 220 takes Gaussian derivatives in, e.g., eight orientations for each color channel. Then the texture is parameterized as a histogram across different orientations and a min-intersection kernel is used. The size similarity detection module 222 computes similarities in size between discrete salient region candidates 214, and computes size data 228. In the illustrative embodiment, the size similarity detection module 222 encourages small regions with similar size to merge. This can be desirable because it ensures that the object locations at all scales are created at all parts of the image.

The illustrative salient region grouping module 230 receives the color data 224, the texture data 226, and the size data 228 and combines the multi-scale salient region candidates 214 into groupings of interest based on the similarities detected. Illustratively, a hierarchical grouping algorithm forms the basis of the selective search. As salient region candidates 214 can yield richer information than pixels, region-based features are used whenever possible to identify groupings of possible foods. Region grouping often contains strong cues to facilitate the facilitate recognition. Region grouping helps grouping small things into chunks for better discrimination. When multiple food items are presented in the same plate, they often belongs to different food categories (e.g. carbohydrate, proteins, vegetables), and can be delineated well against each other. Also in many cases the background plate is homogeneous, and it can be separated from the food items. Regions provide precise localized information, and the relationship between multiple foods can be analyzed with better accuracy. Segmentation on its own can be also useful for finer-grained analysis such as to determine nutrients and caloric estimates.

Figure 8A:
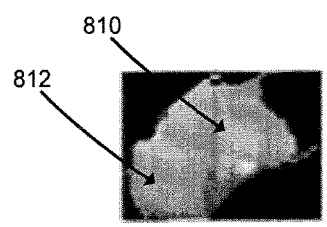
FIGS. 8A-8D are illustrative examples of salient regions extracted from the image of FIG. 7A, produced using the automated food recognition techniques disclosed herein.
Figure 8B:
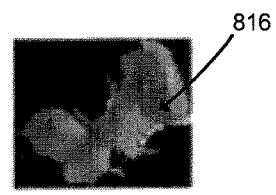
Figure 8C:
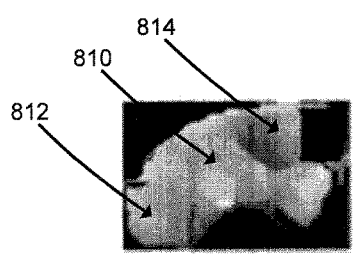
Figure 8D:
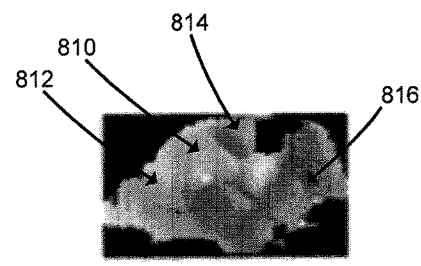

The illustrative salient region grouping module 230 uses a greedy algorithm to iteratively group salient region candidates 214 together. Using the similarity data 224, 226, 228, the salient region grouping module 230 compares a salient region candidate 214 to all neighboring salient region candidates 214 and, if the similarities between the salient region candidates 214 meet a certain threshold, the two most similar salient region candidates 214 are grouped together. New similarities are calculated for the resulting new salient region candidate 214 (resulting from the previous grouping), and the salient region grouping module 230 compares the new resulting salient region candidate 214 to all of its neighboring salient region candidates 214 and determines which salient region candidates 214 are most similar. The process of grouping the most similar salient region candidates 214 is repeated until the whole salient region (e.g., image 205) of the image 102 is accounted for. The salient region grouping module 230 creates salient region groupings 234, each of which may correspond to a discrete food in the image (where the food may be a simple food or a complex food, e.g., a tomato vs. a garden salad). In an example, if an image of food contains a plate of chicken, rice, and green beans, the food detection modules 206 will yield an output of salient region groupings 234 that include a first identified grouping that corresponds to only the chicken, a second identified grouping that corresponds to only the rice, and a third identified grouping that corresponds only to the green beans. In other cases, a salient region grouping 234 includes a combination of discrete foods, such as shown in the examples of FIGS. 8A-8D. Each of FIGS. 8A-8D is an example of a salient region grouping produced by the salient region grouping module 230. Element 810 is a piece of pineapple, which is detected in the groupings of FIGS. 8A, 8C, and 8D. Element 812 is a piece of cantaloupe, which is detected in the groupings of FIGS. 8A, 8C, and 8D. Element 814 is an individual piece of watermelon, which is depicted in FIGS. 8C and 8D. Element 816 is a grouping of multiple pieces of watermelon, which is depicted in FIGS. 8B and 8D. By iteratively analyzing and combining these groupings, the system 100 can identify not only the individual elements of fruit and their estimated portion sizes, but also a larger grouping that identifies the combination of fruits as a fruit salad.

The food classification module 236 receives the salient regions 232 and/or salient region groupings 234 and applies the food identification models 130 using semantic reasoning techniques to classify the food in each salient region 232 or salient region grouping 234. The food classification module 236 uses the low-level features encoded into the image 205 to classify and identify the food present in the original image 102. The identification methods include, but are not limited to, the hierarchical, context-based, user-specific, and co-occurrence techniques discussed above. The food classification module 236 compares the low-level descriptors encoded into the image 205, which are now incorporated into the salient regions 232 and/or salient region groupings 234, to descriptions of known foods. The set of known foods that will be compared to the low-level features of the image 102 is chosen based on the particular food identification model 130 or combination of food identification models 130 being applied. The food classification module 236 uses the low-level feature descriptors to navigate the food ontology in the hierarchical model to compare the image 102 (or salient regions 232 or salient region groupings 234) to a generic database of food. The food classification module 236 can also use the other models, such as the context model 134, user-specific model 136, and co-occurrence model 138, to algorithmically reason about the identity of a food depicted in the image 205.

Once the food and/or food combinations present in the image 102 have been identified, the food recognition module 104 outputs food description data 106 to the interactive output generator 108, as described above. The food description data 1-06 may include, e.g., a food identification label (e.g., a food name or type), a confidence score, and a set of bounding boxes that defines the area of the image that the food recognition module 104 has identified as the food(s) in the image. The food description data 106 can also portion information produced by the portion estimation module 238.

Figure 3:
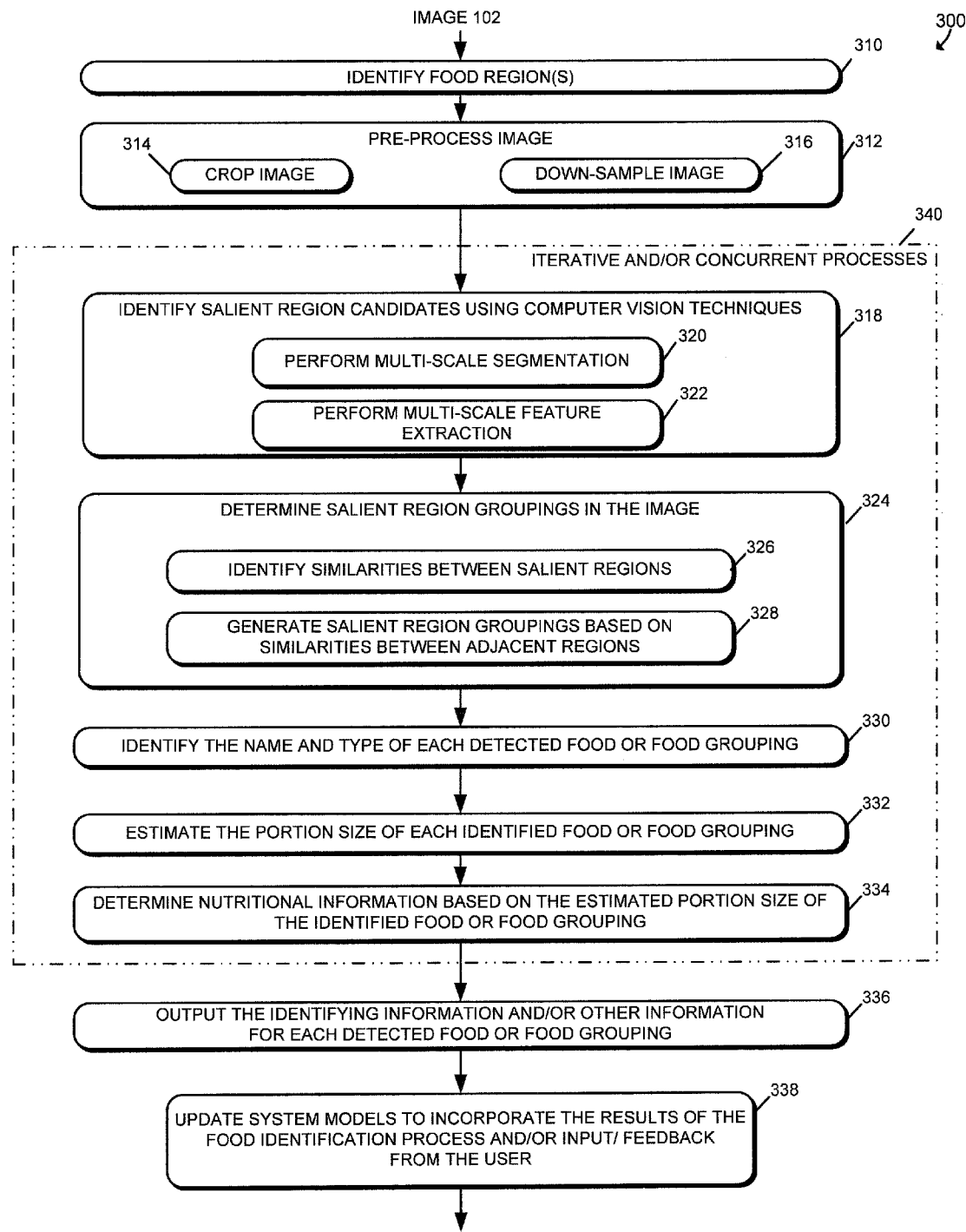
FIG. 3 is a simplified flow diagram of at least one embodiment of a process executable by the system of FIG. 1 to provide automated food recognition and nutritional estimation as disclosed herein.

Referring now to FIG. 3, an example of a process 300 executable by the computing system 100 to provide automated food recognition assistance is shown. The process 300 may be embodied as computerized programs, routines, logic and/or instructions executed by the computing system 100, for example by one or more of the modules and other components shown in FIGS. 1 and 2, described above. Initially, the system 100 receives one or more input files, e.g. a digital image 102. The input file(s) can be embodied as, for example, a digital image captured by a smartphone or other personal electronic device. The input file(s) may be stored on a local computing device and/or a remote computing device (e.g., in personal cloud, such as through a document storing application like DROPBOX). Thus, the input file(s) may be received by a file uploading, file transfer, or messaging capability of the end user's computing device and/or computing system 100 (e.g., communication subsystems 434, 472). Irrespective of the method of receipt or transfer, processing of the image 102 begins in block 310. In block 310, the system 100 algorithmically identifies one or more food regions in the image 102, e.g., without human assistance. To do this, the system 100 may utilize a spectral residual technique, as described above.

At block 312, the computing system 100 pre-processes the image 102 to, e.g., mask out the non-food regions or otherwise limit the portions of the image 102 that are to be processed by the disclosed food recognition technologies to those portions that depict food or likely depict food of interest. In some embodiments, information from one or more of the food identification models 130 may be used in block 310 or 312. For example, if a particular user has an allergy to a particular food, or a preference for monitoring consumption of a particular type of food, the system 100 can identify, in block 310, any corresponding food regions of interest based on the user-specific criteria and mask or crop out the remaining portions of the image.

At block 314, to make the food identification process invariant to the multitude of image sensor resolutions and other factors, the image 102 is cropped to a standard aspect ratio. In some embodiments the aspect ratio of the cropped image is fixed at 1-to-1 because that is the aspect ratio of most food plates, however, of course, other aspect ratios may be suitable for different implementations. At block 316, the cropped image is down-sampled to a fixed resolution. In some embodiments, the image 102 is fixed at a 400×400 resolution for processing, however, of course, other resolutions may be suitable for different implementations.

At block 318, the computing system 100 executes the feature detection algorithms 120 on the image 102 and performs multi-scale segmentation. In block 322, the feature detection algorithms 120 detect a number of different characteristics about the image 102 and determine what part(s) of the image correspond to food. In some embodiments, the feature detection algorithms 120 encode the image 102 with low-level feature descriptors that describe in natural-language the features detected by the algorithms 120. In block 320, the system 100 perform image segmentation to segment the image 102 on a multiple (e.g., at least two) different scales of resolution. To do this, the system 100 breaks the image 102 into a number of different segments that can represent regions of interest (e.g., salient regions 232 or salient region groupings 234). It may be unlikely that the first segmentation of the image 102 will be the segmentation of the image that results in the bounds of the individual foods being correctly determined. If this occurs, the segmentation is done at a number of different scales to provide more information to the system 100. Such multi-scale segmentation enables the system 100 to more accurately identify the food regions in the image. The processes of blocks 320, 322 can be performed iteratively and/or concurrently. For example, segmentation at a one scale of resolution can proceed while feature detection is performed on segments obtained at a different scale.

At block 324, the system 100 groups the various segments/salient regions (e.g., salient region candidates 214) into salient region groupings (e.g., salient regions 232 or salient region groupings 234) that correspond to foods depicted in the image. At block 326, the system 100 compares the previously-detected features of each of the salient regions and determines similarities between the various multi-scale segments of the image. At block 328, the segments are grouped into saliency region groupings based on similarities between segments (e.g., by executing one or more similarity algorithms on adjacent salient regions/segments). The salient region groupings are determined algorithmically by the system 100 by execution, e.g., an optimization algorithm. In some embodiments, the salient region groupings are determined using a greedy algorithm. In some cases, a single salient region may completely depict a single food, whereas in other cases, a food is depicted in multiple adjacent salient regions. Accordingly, the system 100 can perform the disclosed food recognition technologies on individual salient regions and/or salient region groupings as needed.

At block 330, the system 100 identifies the food present in each salient region or salient region grouping in the image 102. This is accomplished by comparing the features of the salient region grouping to features of known food. The system 100 selects the comparison techniques based on the different food identification models 132, 134, 136, 138, that are available. At block 332, the system 100 estimates the portion size of each food or food grouping detected in the image 102 (using, e.g., a pixel counting technique), and at block 334, the system 100 determines nutritional information for the identified foods, based on the estimated portions size(s) determined in block 332. To do this, the system 100 may access an external database of nutritional information or mapping table, as described above.

The processes of blocks 318, 324, 330, 332 and 334 are, in some embodiments, performed iteratively and/or concurrently, as indicated by the box 340. For instance, feature detection, salient region identification, and salient region grouping can be performed concurrently (e.g., feature detection at one scale and grouping at another scale). Additionally, salient region or salient region grouping classification can be performed iteratively and/or concurrently (e.g., classification of different salient regions or salient region groupings can be performed concurrently).

At block 336, the system 100 outputs, to an output device of the computing system 100, food description data, including food identifying information, such as food names, food types, or food categories (e.g., protein, carbohydrate, fiber, etc.). The outputs may also include a confidence score relating how certain the system 100 is that the food identified is correct, the original image overlaid with shading or bounding boxes that identifies the region of the image that the computer is identifying as a particular food, and nutritional facts related to the food. One or more of the outputs may be presented visually or in a non-visual manner, for example, the system 100 may utilize text to speech technology to "say" the food description information. Alternatively or in addition, one or more of the outputs may be directly or indirectly communicated to one or more applications or services (e.g., user-level applications 422). For instance, food name and portion information may be transmitted directly to a meal-tracking application for logging purposes or other uses.

At block 338, the system 100 updates the various learning modules 142 and the food identification models 130 with the information associated with the food identification just made. In this way, the system 100 can improve the algorithms to provide more accurate identification of food in future recognition tasks. The system 100 can update the algorithms, both locally, e.g., the algorithms may be only updated for the specific user that took the photo, or globally, e.g., the generic algorithms used by all users are updated to incorporate the new information. Also, the system 100 can incorporate any user feedback received during or as a result of the food identification process into the algorithms 120 and/or models 130. While some embodiments of the system 100 identify the food without user input, the user can input feedback regarding the output of the system 100. For example, during or after the food recognition process, the user can interactively identify a commonly eaten food to the system 100, e.g., to add the food and, perhaps, priority information, to the user-specific model 136. In another example, the user can interactively edit the food labels, e.g., to correct or further refine a food label or a misidentified portion size, to provide better food-intake tracking or for other reasons.

Implementation Examples

Figure 4:
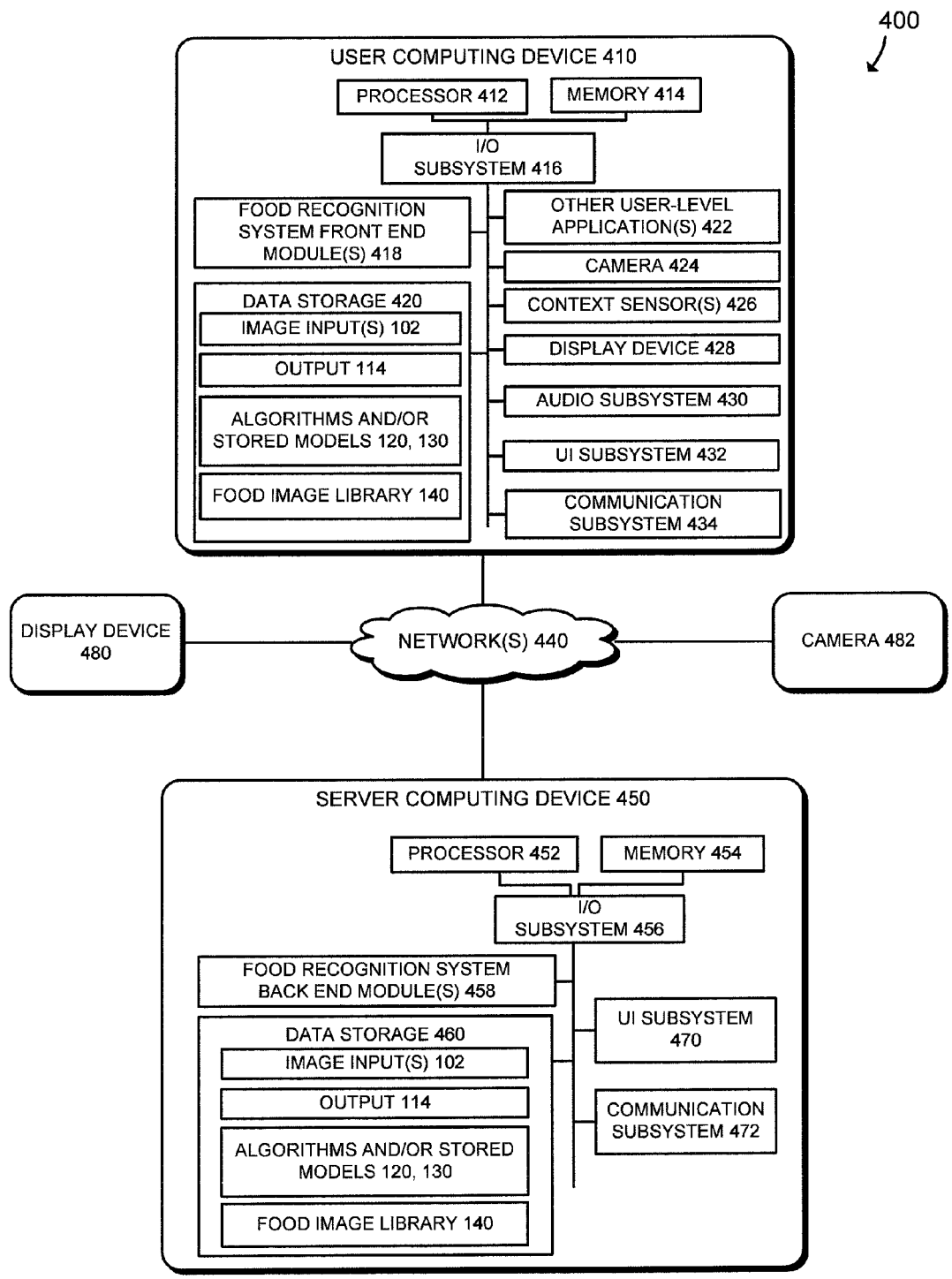
FIG. 4 is a simplified block diagram of an exemplary computing environment in which at least one embodiment of the system of FIG. 1 may be implemented.

Referring now to FIG. 4, a simplified block diagram of an embodiment 400 of the food recognition assistant computing system 100 is shown. While the illustrative embodiment 400 is shown as involving multiple components and devices, it should be understood that the computing system 100 may constitute a single computing device, alone or in combination with other devices. The embodiment 400 includes a user computing device 410, which embodies features and functionality of a "client-side" or "front end" portion 418 of the computing system 100 depicted in FIG. 1, and a server computing device 450, which embodies features and functionality of a "server-side" or "back end" portion 458 of the system 100. The embodiment 400 includes or communicates with one or more other user-level applications 422 (which may include mobile apps or web-based services for weight management, fitness tracking, personal health, journaling, etc.). The embodiment 400 also includes a camera 424, one or more context sensors 426 (e.g., motion sensors, location sensors, a Global Positioning System (GPS) receiver, etc.), a display device 428, an audio subsystem 430, a user interface (UI) subsystem 432, and a communication subsystem 434. The embodiment 400 further includes a display device 480 and a camera 482, each of which may be used alternatively or in addition to the camera 424 and display device 428 of the user computing device 410. For instance, the camera 482 may be embodied in a wearable device, such as smart glasses, a smart watch, or a smart fitness band or bracelet, and the wearable device may communicate images taken by the wearable device to the user computing device 410 for food recognition. As another example, images 102 and/or food description data 106 may be displayed on the display device 428, the display device 480 (which may be embodied in, e.g., a wearable device or a smart appliance, for example), or both display devices. Each or any of the computing devices 410, 450, 480, 482 may be in communication with one another via one or more networks or other types of communication links 440.

The computing system 100 or portions thereof may be distributed across multiple computing devices that are connected to the network(s) 440 as shown. In other embodiments, however, the computing system 100 may be located entirely on, for example, the computing device 410 or one of the devices 450, 480, or 482. In some embodiments, portions of the system 100 may be incorporated into other systems or computer applications. Such applications or systems may include, for example, commercial off the shelf (COTS) or custom-developed virtual personal assistant applications, health or fitness tracking services, content sharing services such as YOUTUBE and INSTAGRAM, and social media services such as FACEBOOK and TWITTER. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The illustrative user computing device 410 includes at least one processor 412 (e.g. a microprocessor, microcontroller, digital signal processor, etc.), memory 414, and an input/output (I/O) subsystem 416. The computing device 410 may be embodied as any type of computing device capable of performing the functions described herein, such as a personal computer (e.g., desktop, laptop, tablet, smart phone, mobile device, body-mounted device, wearable device, smart appliance, etc.), a server, an enterprise computer system, a network of computers, a combination of computers and other electronic devices, or other electronic devices. Although not specifically shown, it should be understood that the I/O subsystem 416 typically includes, among other things, an I/O controller, a memory controller, and one or more I/O ports. The processor 412 and the I/O subsystem 416 are communicatively coupled to the memory 414. The memory 414 may be embodied as any type of suitable computer memory device (e.g., volatile memory such as various forms of random access memory).

The I/O subsystem 416 is communicatively coupled to a number of hardware and/or software components, including the components of the computing system shown in FIGS. 1 and 2 or portions thereof (e.g., the food recognition assistant front end modules 418), the user-level applications(s) 422, the camera 424, the context sensor(s) 426, the display device 428, the audio subsystem 430, the user interface subsystem 432, and the communication subsystem 434. As used herein, a "camera" may refer to any device that is capable of acquiring and recording two-dimensional (2D) or three-dimensional (3D) video images of portions of the real-world environment, or is capable of acquiring information beyond the visual-light spectrum, such as infrared, x-ray, spectral analysis information, and others, and may include cameras with one or more fixed camera parameters and/or cameras having one or more variable parameters, fixed-location cameras (such as "stand-off" cameras that are installed in walls or ceilings), and/or mobile cameras (such as cameras that are integrated with consumer electronic devices, such as laptop computers, smart phones, tablet computers, wearable electronic devices and/or others.

The camera 424, context sensor(s) 426, the display device 428, and the audio subsystem 430 may form part of the UI subsystem 432, which includes one or more user input devices (e.g., a touchscreen, keyboard, virtual keypad, microphone, etc.) and one or more output devices (e.g., speakers, displays, LEDs, etc.). For instance, the audio subsystem 430 includes at least one microphone, at least one speaker, and associated hardware, software, or firmware to operate the microphone and speaker to, among other things, enable a spoken natural language dialog between a human user and the user computing device 410. As such, the audio subsystem 430 can include speech recognition and natural language processing technology, as well as natural language generation technology (e.g., text to speech technology). The UI subsystem 432 may include, for example, a touchscreen display, a touch-sensitive keypad, a kinetic sensor and/or other gesture-detecting device, an eye-tracking sensor, and/or other devices that are capable of detecting human interactions with a computing device. The context sensor(s) 426 can include devices both internal and external to the user computing 410. The context sensor(s) 426 can include a location detector module, e.g., GPS, a local time detector, a map of the local area, an accelerometer, or any number of wearable devices. For example, wearable bands that detect and track motion of the user's arm can be used to determine how many times the user lifted their arm while eating, which can be used to help with the estimation of how much food was actually consumed. A wearable video camera (e.g., Google Glass, GoPro, MeCam, etc.) allows continuous visual imaging of the food, as it is consumed, and enables a more accurate recognition of food items consumed. These wearable devices can be used to refine the identification of food and portion sizes by capturing food from different angles and distances, or by opportunistically selecting frames where there is less overlap amount particular multiple items of food. In order to support immediate real-time analysis, captured video, or other information, can be communicated through communication subsystems 434, 472 and network(s) 440 to the relevant computation resources. For example, the wearable device can connect to the user computing device via a wireless protocol, including WiFi or Bluetooth.

The devices 424, 426, 428, 430, 480, 482 are illustrated in FIG. 4 as being in communication with the user computing device 410, either by the I/O subsystem 416 or a network 440. It should be understood that any or all of the devices 424, 426, 428, 430, 480, 482 may be integrated with the computing device 410 or embodied as a separate component. For example, the camera 482 may be embodied in a wearable device, such as a head-mounted display, GOOGLE GLASS-type device, which then communicates wirelessly with the computing device 410. Alternatively, the devices 424, 426, 428, 430, 480, 482 may be embodied in a single computing device, such as a smartphone or tablet computing device.

The I/O subsystem 416 is also communicatively coupled to one or more data storage devices 420 and the communication subsystem 434. It should be understood that each of the foregoing components and/or systems may be integrated with the computing device 410 or may be a separate component or system that is in communication with the I/O subsystem 416 (e.g., over a network 440 or a bus connection).

The data storage device 420 may include one or more hard drives or other suitable data storage devices (e.g., flash memory, memory cards, memory sticks, and/or others). In some embodiments, portions of the computing system 100 (e.g., the front end modules 418, the input images 102, the generated output(s) 116, the algorithms 120 and/or stored models 130, the food image library 140 and/or other data), reside at least temporarily in the storage media 420. Portions of the computing system 100, (e.g., the front end modules 418, the input images 102, the generated output(s) 116, the algorithms and/or stored models 120, 130, and the food image library 14, and/or other data may be copied to the memory 414 during operation of the computing device 410, for faster processing or other reasons.

The communication subsystem 434 communicatively couples the user computing device 410 to one or more other devices, systems, or communication networks, e.g., a local area network, wide area network, personal cloud, enterprise cloud, public cloud, a Near Field Communication (NFC) connection, and/or the Internet, for example. Accordingly, the communication subsystem 434 may include one or more short and/or long range wired or wireless (including optical) network interface software, firmware, or hardware, for example, as may be needed pursuant to the specifications and/or design of the particular embodiment of the system 100.

The display device 480, the camera 482, and the server computing device 450 each may be embodied as any suitable type of computing device or personal electronic device capable of performing the functions described herein, such as any of the aforementioned types of devices or other electronic devices. For example, in some embodiments, the server computing device 450 may operate a "back end" portion 458 of the food recognition assistant computing system 100. The server computing device 450 may include one or more server computers including storage media 460, which may be used to store portions of the computing system 100, such as the back end modules 458 and/or portions of the image inputs 102, the generated output(s) 116, the algorithms and/or stored models 120, 130 and the food image library 140, and/or other data. The illustrative server computing device 450 also includes a UI subsystem 470 and a communication subsystem 472. In general, components of the server computing device 450 having the same or similar names to components of the computing device 410 described above may be embodied similarly. Further, each of the devices 480, 482 may include components similar to those described above in connection with the user computing device 410 and/or the server computing device 450. The computing system 100 may include other components, sub-components, and devices not illustrated in FIG. 4 for clarity of the description. In general, the components of the computing system 100 are communicatively coupled as shown in FIG. 4 by signal paths, which may be embodied as any type of wired or wireless signal paths capable of facilitating communication between the respective devices and components.

Example Usage Scenarios

Referring now to FIGS. 5A and 5B, illustrative examples of output of an embodiment of the food recognition assistant system 100 as disclosed herein are shown. In FIG. 5A, a mobile computing device 500 is embodied to include a housing 510. The housing 510 supports a number of sensors 512, 514 (e.g., optical sensor, microphone, accelerometer, GPS locator) and a display screen 516. The display screen 516 graphically displays an illustrative output 518 of the food recognition assistant 100 configured as disclosed herein. The graphical output 518 includes the image of food taken by the user 520, with bounding markers 522*a*, 522*b*, 522*c* (here, color-coded shading) defining the location of the food identified in the image. The output 518 further includes food identifications 524, confidence scores 526 relating to the food identifications, and portion estimates and nutritional facts 528 related to the identified foods.

In the example of FIG. 5B, a display screen 550 of a personal mobile electronic device is shown, displaying illustrative output 116 of the system 100. The output 116 includes bounding boxes 552, 554, 556, 558 overlaid on a digital picture of a plate of food. Each bounding box 552, 554, 556, 558 identifies a salient region or salient region grouping corresponding to an identified food. The output 116 also includes food description data 106, e.g., labels and confidence values 560, 562, 564, 566, each of which corresponds to one of the bounding boxes 552, 554, 556, 558 displayed on the image. The label 560 corresponds to the bounding box 558, the label 562 corresponds to the bounding box 556, the label 564 corresponds to the bounding box 554, and the label 566 corresponds to the bounding box 552. In some embodiments, the bounding boxes and labels are color-coded so that it is easy for the user to visually correlate the food description data with the associated portions of the image. In both the example of FIG. 5A and the example of FIG. 5B, the system 100 was able to accurately detect both simple, individual foods and more complex foods consisting of a combination of different individual foods (e.g., "burger" in FIG. 5A is a complex food including ground meat and a bun, with the ground meat partially obscured; "green salad" and "mixed vegetables" are complex foods made up of a combination of individual food items, detected in the example of FIG. 5B). The illustrative confidence values in FIGS. 5A and 5B are numerical values ranging from 0 to 1, with a higher value indicating a higher degree of confidence in the accuracy of the food recognition, as determined by the system 100. Other types of confidences values or representations of the assessed level of accuracy can be used in other embodiments, of course.

Additional Examples

Illustrative examples of the technologies disclosed herein are provided below. An embodiment of the technologies may include any one or more, and any combination of, the examples described below.

In an example 1, a food recognition assistant embodied in one or more non-transitory machine accessible storage media. The food recognition assistant includes instructions executable by one or more processors to cause a personal mobile electronic device to: receive a single digital image; execute one or more feature detection algorithms using at least two different scales of resolution to determine one or more salient regions of the image without relying on a user to specify the one or more salient regions, the one or more salient regions depicting food; execute a semantic reasoning technique to identify a food present in the image by comparing a characteristic of the one or more salient regions with a characteristic of a known food; and by an output device of the personal mobile electronic device, output a name of the identified food.

An example 2 includes the subject matter of example 1, including instructions executable, with the output device, to output a confidence score associated with the identified food. An example 3 includes the subject matter of example 1 or example 2, where the output device includes a display device, and the executable instructions are to cause the personal mobile electronic device to display, with the display device, the received image and a name of the identified food in relation to the received image. An example 4 includes the subject matter of any of examples 1-3, including instructions executable to algorithmically estimate a portion size of the identified food. An example 5 includes the subject matter of example 4, including instructions executable to determine a nutritional fact associated with the identified food based on the estimated portion size, and, by an output device of the personal mobile electronic device, output the nutritional fact associated with the identified food. An example 6 includes the subject matter of any of examples 1-5, including instructions executable to determine the salient region using a plurality of different image processing techniques at multiple scales, the image processing techniques including at least two of: a histogram of oriented gradients (HoG), an edge orientation histogram, a scale-invariant feature transform descriptors (SIFT), a shape context technique, and a spectral residual method. An example 7 includes the subject matter of any of examples 1-6, including instructions executable to identify the food algorithmically without relying on input from a human user. An example 8 includes the subject matter of any of examples 1-8, including instructions executable to algorithmically classify the one or more salient regions using a food ontology. An example 9 includes the subject matter of example 1, including instructions executable to algorithmically identify a plurality of different characteristics of the one or more salient regions, including at least two of: color, texture, and size. An example 10 includes the subject matter of example 9, including instructions executable to semantically label the characteristics of the one or more salient regions by algorithmically applying natural language descriptors to the image for each identified characteristic. An example 11 includes the subject matter of example 10, including instructions executable to compare the natural language descriptors to a library of known food descriptors to identify a food in the one or more salient regions. An example 12 includes the subject matter of any of examples 1-11, including instructions executable to identify a plurality of salient regions in the image, execute a similarity algorithm to group adjacent salient regions based on similarity; and identify food present in the image by comparing a characteristic of a salient region grouping with a characteristic of a known food.

In an example 13, a food recognition assistant embodied in one or more non-transitory machine accessible storage media, the food recognition assistant including instructions executable by one or more processors to cause a personal mobile electronic device to: receive a digital image; execute one or more feature detection algorithms to determine a plurality of salient regions of the image, each salient region being a region of the image that depicts food; and execute a semantic reasoning technique to identify a food present in at least one of the salient regions, at least partly based on: (a) comparing a characteristic of the salient region with a characteristic of a known food, and (b) a likelihood of a different food being present in a different one of the salient regions; where at least one of executing the feature detection algorithms and executing the semantic reasoning technique is performed using at least two different scales of resolution with respect to the image; and with an output device of the personal mobile electronic device, output data indicative of the identified food and the different food.

An example 14 includes the subject matter of example 13, including instructions executable to cause the personal mobile electronic device to execute the one or more feature detection algorithms without relying on a human user to define the salient regions. An example 15 includes the subject matter of example 13 or example 14, including instructions executable to, by an output device of the personal mobile electronic device, output a confidence score and nutritional facts associated with the identified food and the different food. An example 16 includes the subject matter of any of examples 13-15, including instructions executable to group the salient regions into salient region groupings using an iterative greedy algorithm. An example 17 includes the subject matter of any of examples 13-16, including instructions executable to identify a food in a salient region using a food ontology. An example 18 includes the subject matter of any of examples 13-17, including instructions executable to identify a food in a salient region using stored information indicative of common pairings of foods. An example 19 includes the subject matter of any of examples 13-18, including instructions executable to execute one or more similarity algorithms to group adjacent salient regions into a salient region grouping based on similarity.

In an example 20, a personal mobile electronic device includes: one or more processors; an input/output subsystem coupled to the one or more processors; a camera coupled to the input/output subsystem; a display device coupled to the input/output subsystem; and memory including instructions executable by the one or more processors to cause the personal mobile electronic device to: with the camera, take a single picture of a plate of food; with the input/output subsystem, transmit the picture of the plate of food to a server computing device; with the input/output subsystem, receive from the server computing device, data identifying a food present in the picture of the plate of food and an algorithmically determined-confidence level associated with the identified food, where the data identifying the food present in the picture of the plate of food results from a multi-scale computer vision analysis of the single picture of the plate of food; and with the display device, display a label indicative of the identified food. An example 21 includes the subject matter of example 20, where the instructions are executable to, with the display device, display a label indicative of an algorithmically determined nutritional fact relating to the identified food.

In an example 22, a food recognition assistant is embodied in one or more non-transitory machine accessible storage media of a computing system. The food recognition assistant includes instructions executable by one or more processors to cause the computing system to: receive a digital image; obtain context data indicative of the context in which the digital image was captured; detect a salient region of the image by algorithmically recognizing a plurality of different features present in the image; identify a plurality of characteristics of the salient region, including at least two of: color, texture, size and shape; compare the context data to data indicative of known relationships between foods and contextual cues; and identify a food depicted in the salient region based on the salient region characteristics and the context data.

An example 23 includes the subject matter of example 22, including instructions executable to algorithmically weight the salient region characteristics and the context data, and identify the food based on the weight of the salient region characteristics and the weight of the context data. An example 24 includes the subject matter of example 22 or example 23, where the context data includes data indicative of a location at which the image was taken cross-referenced with a map to determine if the image was taken in a food dispensary. An example 25 includes the subject matter of any of examples 22-24, where the context data includes a selection of foods available at a food dispensary at which the image was taken, and the food recognition assistant further includes instructions executable to compare the characteristics of the salient region to the selection of foods available. An example 26 includes the subject matter of any of examples 22-25, where the context data includes the time of day at which the image was taken, and the food recognition assistant includes instructions executable to compare the characteristics of the salient region of the image to stored data indicative of foods that are commonly consumed at the time the image was taken. An example 27 includes the subject matter of any of examples 22-26, including instructions executable to utilize the digital image, the results of the food identification, and the context data to build a user-specific model that includes user-specific data indicative of commonly eaten foods. An example 28 includes the subject matter of example 27, including instructions executable to compare the characteristics of the salient region to stored information in the user-specific model to identify a food in the digital image. An example 29 includes the subject matter of example 27 or example 28, where the user-specific model includes one or more of: user dietary history, user dietary preferences, and user restaurant preferences. An example 30 includes the subject matter of any of examples 22-29, including instructions executable to algorithmically recognize the plurality of different features of the salient region using at least two different scales of resolution.

In an example 31, a personal mobile electronic device includes: one or more processors; an input/output subsystem coupled to the one or more processors; a camera coupled to the input/output subsystem; a context sensor coupled to the input/output subsystem; a display device coupled to the input/output subsystem; and memory including instructions executable by the one or more processors to cause the personal mobile electronic device to: with the camera, take a picture of a plate of food; with the context sensor, obtain context data indicative of the context in which the picture of the plate of food was taken; with the one or more processors: detect a salient region of the picture of the plate of food by executing one or more feature detection algorithms; identify a plurality of characteristics of the salient region, including at least two of: color, texture, size and shape; compare the context data to data indicative of known relationships between foods and contextual cues; and identify a food depicted in the salient region based on the salient region characteristics and the context data; and with the display device, display a label indicative of the identified food.

An example 32 includes the subject matter of example 31, including instructions executable to, with the input/output subsystem, transmit the picture of the plate of food and the context data to a server computing device and receive from the server computing device, data identifying a food present in the picture of the plate of food and an algorithmically determined confidence level associated with the identified food. An example 33 includes the subject matter of example 31 or example 32, including instructions executable to, with the input/output subsystem, transmit the picture of the plate of food and the context data to a server computing device and receive from the server computing device, data identifying a food present in the picture of the plate of food and an algorithmically determined estimate of a portion size of the identified food depicted in the picture of the plate of food. An example 34 includes the subject matter of example 33, including instructions executable to determine a nutritional fact associated with the identified food based on the estimated portion size, and, with an output device of the personal mobile electronic device, output the nutritional fact associated with the identified food. An example 35 includes the subject matter of example 33 or example 34, including instructions executable to, with the input/output subsystem, transmit data indicative of the identified food and the estimated portion size to a food-related computer application. An example 36 includes the subject matter of example 31, where the context data includes a selection of foods available at a food dispensary at which the picture of the plate of food was taken, and the personal mobile electronic device is to execute instructions to compare the characteristics of the salient region to the selection of foods available at the food dispensary. An example 37 includes the subject matter of any of examples 31-36, where the context data includes the time of day at which the picture of the plate of food was taken, and the personal mobile electronic device is to execute instructions to compare the characteristics of the salient region of the image to stored data indicative of foods that are commonly consumed at the time the picture of the plate of food was taken. An example 38 includes the subject matter of any of examples 31-37, including instructions executable to utilize the picture of the plate of food, the results of the food identification, and the context data to build a user-specific model that includes user-specific, context-specific data indicative of previously consumed foods. An example 39 includes the subject matter of example 38, including instructions executable to compare the characteristics of the salient region to stored information in the user-specific model to identify a food in the picture of the plate of food. An example 40 includes the subject matter of example 38 or example 39, including a microphone, a speaker, and instructions executable to utilize the user-specific model to, with the microphone and the speaker, engage in a spoken natural language dialog relating to food. An example 41 includes the subject matter of any of examples 31-40, including instructions executable to store data indicative of the identified food and the estimated portion size in an electronic food journal.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A food recognition assistant embodied in one or more non-transitory machine accessible storage media of a computing system, the food recognition assistant comprising instructions executable by one or more processors to cause the computing system to:
  receive a digital image;
  obtain context data indicative of the context in which the digital image was captured;
  detect one or more regions of the image that are visually salient in comparison to other regions of the image by algorithmically recognizing a plurality of different features present in the image;
  identify a plurality of characteristics of the one or more salient regions, including at least two of: color, texture, size and shape;
  compare the context data to data indicative of known relationships between foods and contextual cues; and
  identify a food depicted in the one or more salient regions based on the salient region characteristics and the context data.

2. The food recognition assistant of claim 1, comprising instructions executable to algorithmically weight the salient region characteristics and the context data, and identify the food based on the weight of the salient region characteristics and the weight of the context data.

3. The food recognition assistant of claim 1, wherein the context data comprises data indicative of a location at which the image was taken cross-referenced with a map to determine if the image was taken in a food dispensary.

4. The food recognition assistant of claim 1, wherein the context data includes a selection of foods available at a food dispensary at which the image was taken, and the food recognition assistant further comprises instructions executable to compare the characteristics of the one or more salient regions to the selection of foods available.

5. The food recognition assistant of claim 1, wherein the context data includes the time of day at which the image was taken, and the food recognition assistant comprises instructions executable to compare the characteristics of the one or more salient regions of the image to stored data indicative of foods that are commonly consumed at the time the image was taken.

6. The food recognition assistant of claim 1, comprising instructions executable to utilize the digital image, the results of the food identification, and the context data to build a user-specific model that includes user-specific data indicative of commonly eaten foods.

7. The food recognition assistant of claim 6, comprising instructions executable to compare the characteristics of the one or more salient regions to stored information in the user-specific model to identify a food in the digital image.

8. The food recognition assistant of claim 6, wherein the user-specific model includes one or more of: user dietary history, user dietary preferences, and user restaurant preferences.

9. The food recognition assistant of claim 1, comprising instructions executable to algorithmically recognize the plurality of different features of the one or more salient regions using at least two different scales of resolution.

10. A personal mobile electronic device comprising: one or more processors;
   an input/output subsystem coupled to the one or more processors;
   a camera coupled to the input/output subsystem;
   a context sensor coupled to the input/output subsystem;
   a display device coupled to the input/output subsystem; and
   memory comprising instructions executable by the one or more processors to cause the personal mobile electronic device to:
      with the camera, take a picture of a plate of food;
      with the context sensor, obtain context data indicative of the context in which the picture of the plate of food was taken;
      with the one or more processors:
         detect one or more regions of the picture of the plate of food that are visually salient in comparison to other regions of the picture by executing one or more feature detection algorithms;
         identify a plurality of characteristics of the one or more salient regions, including at least two of: color, texture, size and shape;
         compare the context data to data indicative of known relationships between foods and contextual cues; and
         identify a food depicted in the one or more salient regions based on the salient region characteristics and the context data; and
      with the display device, display a label indicative of the identified food.

11. The personal mobile electronic device of claim 10, comprising instructions executable to, with the input/output subsystem, transmit the picture of the plate of food and the context data to a server computing device and receive from the server computing device, data identifying a food present in the picture of the plate of food and an algorithmically determined confidence level associated with the identified food.

12. The personal mobile electronic device of claim 10, comprising instructions executable to, with the input/output subsystem, transmit the picture of the plate of food and the context data to a server computing device and receive from the server computing device, data identifying a food present in the picture of the plate of food and an algorithmically determined estimate of a portion size of the identified food depicted in the picture of the plate of food.

13. The personal mobile electronic device of claim 12, comprising instructions executable to determine a nutritional fact associated with the identified food based on the estimated portion size, and, with an output device of the personal mobile electronic device, output the nutritional fact associated with the identified food.

14. The personal mobile electronic device of claim 12, comprising instructions executable to, with the input/output subsystem, transmit data indicative of the identified food and the estimated portion size to a food-related computer application.

15. The personal mobile electronic device of claim 12, comprising instructions executable to store data indicative of the identified food and the estimated portion size in an electronic food journal.

16. The personal mobile electronic device of claim 10, wherein the context data includes a selection of foods available at a food dispensary at which the picture of the plate of food was taken, and the personal mobile electronic device is to execute instructions to compare the characteristics of the one or more salient regions to the selection of foods available at the food dispensary.

17. The personal mobile electronic device of claim 10, wherein the context data includes the time of day at which the picture of the plate of food was taken, and the personal mobile electronic device is to execute instructions to compare the characteristics of the one or more salient regions of the image to stored data indicative of foods that are commonly consumed at the time the picture of the plate of food was taken.

18. The personal mobile electronic device of claim 10, comprising instructions executable to utilize the picture of the plate of food, the results of the food identification, and the context data to build a user-specific model that includes user-specific, context-specific data indicative of previously consumed foods.

19. The personal mobile electronic device of claim 18, comprising instructions executable to compare the characteristics of the one or more salient regions to stored information in the user-specific model to identify a food in the picture of the plate of food.

20. The personal mobile electronic device of claim 18, comprising a microphone, a speaker, and instructions executable to utilize the user-specific model to, by the microphone and the speaker, engage in a spoken natural language dialog relating to food.

* * * * *